US009681184B1

(12) United States Patent
Killick et al.

(10) Patent No.: US 9,681,184 B1
(45) Date of Patent: Jun. 13, 2017

(54) TRACKING AND VERIFICATION FOR CONTENT PROMOTION

(71) Applicant: Cox Communications, Inc., Atlanta, GA (US)

(72) Inventors: Ray Killick, Alpharetta, GA (US); Muhammad Asif Raza, McDonough, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 0 days.

(21) Appl. No.: 15/095,971

(22) Filed: Apr. 11, 2016

(51) Int. Cl.
*H04N 7/16* (2011.01)
*H04N 21/442* (2011.01)
*H04W 24/08* (2009.01)
*H04N 21/466* (2011.01)
*H04N 21/25* (2011.01)
*H04N 21/61* (2011.01)
*H04N 21/45* (2011.01)
*H04N 21/258* (2011.01)
*H04N 21/4784* (2011.01)
*H04N 21/4788* (2011.01)

(52) U.S. Cl.
CPC ..... *H04N 21/44204* (2013.01); *H04N 21/252* (2013.01); *H04N 21/25891* (2013.01); *H04N 21/4532* (2013.01); *H04N 21/4667* (2013.01); *H04N 21/4784* (2013.01); *H04N 21/4788* (2013.01); *H04N 21/6181* (2013.01); *H04W 24/08* (2013.01)

(58) Field of Classification Search
CPC .......... H04N 21/812; H04N 21/44008; H04N 2007/17372; H04H 60/43
See application file for complete search history.

(56) References Cited

U.S. PATENT DOCUMENTS 6,766,524 B1 * 7/2004 Matheny ............ G06Q 30/0226 348/E7.07
8,433,815 B2 * 4/2013 van Coppenolle .... G06Q 30/06 709/235

* cited by examiner

*Primary Examiner* — Sumaiya A Chowdhury
(74) *Attorney, Agent, or Firm* — Merchant & Gould

(57) ABSTRACT

Exposing consumers to content of secondary interest via a content distribution network is becoming increasingly difficult as Video on Demand gains popularity and consumers isolate themselves from secondary content, including: new programs, emergency alerts, etc. Additionally, ensuring that the consumers are consuming secondary content that is provided to them via the content distribution network poses technical difficulties for the service provider. Therefore, systems and methods that encourage consumers to consume secondary content and verify its consumption non-intrusively are of increasing importance to service providers. Providing consumers with the ability to opt in and out of tracking and verification for the promotion of content allows consumers to be provided secondary content and for the service provider to appropriately reward the consumers for consuming the content to encourage additional consumption of secondary content. Verification may include passive and active feedback from the consumer via a mobile computing device or set top box.

20 Claims, 6 Drawing Sheets

TRACKING AND VERIFICATION FOR CONTENT PROMOTION

BACKGROUND

The rise of Video on Demand (VOD) services has enabled consumers to avoid unwanted content of secondary interest (i.e., secondary content) to focus on wanted content of primary interest (i.e., primary content) to the detriment of the producers of secondary content. In contrast to primary content, which is expressly wanted by the consumer, secondary content includes programs that the consumer does not expressly wish to watch (e.g., a program overrunning its timeslot into the primary content's timeslot, a different program), unwanted commercials (cf. Super Bowl advertisements and movie trailers, which are frequently wanted), and unrequested alerts (e.g., Emergency Alert System messages). Content providers have tried several methods to ensure that VOD consumers view secondary content, so that new programs are given a chance by consumers, commercials present their messages, and alerts are received in a timely manner. These methods have included making the secondary content more interesting (e.g., Super Bowl advertisements), blocking access to (or superseding) the primary content until the secondary content is consumed, superimposing secondary content over primary content, and otherwise rewarding the consumption of the secondary content. These methods, however, are relatively ineffective in the long term, as even once-interesting content can become repetitive, blocking access to, superseding, and superimposing primary content can annoy consumers, and reward systems can be gamed by consumers.

SUMMARY

Aspects of the present disclosure provide for systems and methods to promote content of secondary interest to consumers (i.e., secondary content) over content of primary interest to consumers (i.e., primary content) by enabling a television service provider to credit consumers for consuming secondary content and to ensure that the secondary content has actually been consumed by the consumer before awarding the credit. Because the consumer is remote to the television service provider, ensuring that the secondary content is actually consumed before credit is awarded poses a technical problem that the present disclosure solves without the aggravation that other approaches impose on consumers, and at a reduced risk of being gamed by consumers.

Consumers may opt in or opt out of a service that provides credit for watching or listening to secondary content, and that credit may be transferred between accounts. For example, consumers within a household may pool their credits under a subscriber account for the household. Credits may be transferred between consumers and accounts and credits may be exchanged for various rewards from the television service provider. The rewards include, but are not limited to, access to VOD content, enhanced service (e.g., higher definition content, higher speed of service), and discounts to provided services. Consumers are motivated to use the system and may freely opt out (and back in) to avoid being aggravated by the consumption of secondary content.

Because providing the rewards without effectively verifying that the secondary content has been consumed is detrimental to the television service provider, the present disclosure provides for systems and methods to verify that the secondary content that a consumer is being credited for is actually being consumed. For example, two consumers may select secondary content of a pilot episode of a new television series and the first consumer leaves the room while the episode is playing, whereas the second consumer actually watches the episode, which the present disclosure will enable the television service provider to distinguish between and credit (or not credit) accordingly.

Similarly, providing rewards for consuming primary content is inefficient for the television service provider; the credits provided for consuming content that the consumer already desired to consume could be better allocated to encourage the consumption of other content. The present disclosure therefore provides for the adjustment of how much credit is awarded as content rises or falls in desirability (i.e., shifts between being primary content and secondary content). Additionally, varying levels of credit are assigned depending on the amount of exposure to the secondary content. For example, a subscriber account with five consumers under the account (e.g., a household of five) may be given greater credit for consuming secondary content than a subscriber account associated with one consumer.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Figure 1:
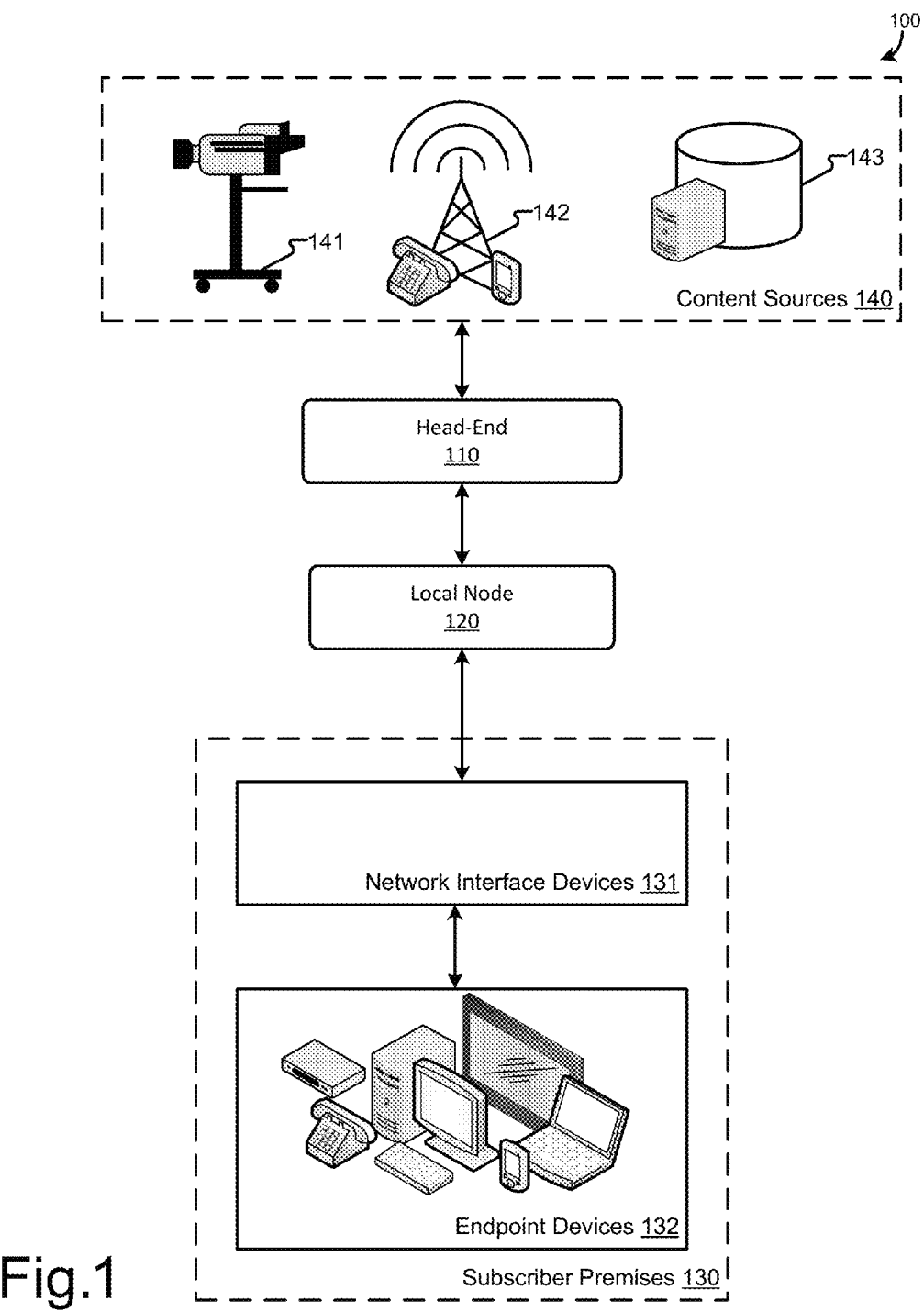
FIG. 1 illustrates an example Content Delivery Network with which the present disclosure may be practiced.

As briefly described above, aspects of the present disclosure provide for systems and methods to promote content of secondary interest to consumers (i.e., secondary content) over content of primary interest to consumers (i.e., primary content) by enabling a television service provider to credit consumers for consuming secondary content and ensure that the secondary content has actually been consumed by the consumer before awarding the credit. Because the consumer is remote to the television service provider, ensuring that the secondary content is actually consumed before credit is awarded poses a technical problem that the present disclosure solves without the aggravation that other approaches impose on consumers and at a reduced risk of being gamed by consumers.

Consumers may opt in or opt out of a service that provides credit for watching or listening to secondary content, and that credit may be transferred between accounts. For example, consumers within a household may pool their credits under a subscriber account for the household. Credits may be transferred between consumers and accounts and may be exchanged for various rewards from the television service provider. The rewards include, but are not limited to, access to Video On Demand (VOD) content, enhanced service (e.g., higher definition content, higher speed of service), and discounts to provided services. Consumers are motivated to use the system and may freely opt out (and back in) to avoid being aggravated by the consumption of secondary content.

Because providing the rewards without effectively verifying that the secondary content has been consumed is detrimental to the television service provider, the present disclosure provides for systems and methods to verify that the secondary content that a consumer is being credited for is actually being consumed. For example, two consumers may select secondary content of a pilot episode of a new television series and the first consumer leaves the room while the episode is playing, whereas the second consumer actually watches the episode, which the present disclosure will enable the television service provider to distinguish between and credit (or not credit) accordingly.

Similarly, providing rewards for consuming primary content is inefficient for the television service provider; the credits provided for consuming content that the consumer already desired to consume could be better allocated to encourage the consumption of other content. The present disclosure therefor provides for the adjustment of how much credit is awarded as content rises or falls in desirability (i.e., shifts between being primary content and secondary content). Additionally, varying levels of credit are assigned depending on the amount of exposure to the secondary content. For example, a subscriber account with five consumers under the account (e.g., a household of five) may be given greater credit for consuming secondary content than a subscriber account associated with one consumer.

FIG. 1 illustrates an example Content Delivery Network (CDN) 100 with which the present disclosure may be practiced. Services originate at a head-end 110, which distributes services to local nodes 120, which in turn serve subscriber premises 130. The CDN 100 provides tiers of caching and processing from which data are requested and transmitted over a physical network (which may include wired and wireless components), enabling the distribution of data and services for quick access by consumers at lower levels of the tier from higher levels of the tier where the content originates. Content may remain cached at a given tier in the CDN 100 according to a Time to Live (TTL) value associated with the content and/or the tier (e.g., 6, 12, 24 hours), such that the content will expire according to the TTL value so that the CDN 100 may reclaim the memory used to cache the expired content item to cache a different content item. Services include, but are not limited to cable television service, internet service, and telephone service, and one consumer may be provided with one or more services by the service provider over the CDN 100.

The CDN 100 illustrated in FIG. 1 represents key components in a hybrid fiber-coaxial (HFC) network used to link subscriber premises 130 with content sources 140 to provide content. The head-end 110 is in communication with the local node 120 via fiber optic cables, and the local node 120 is in communication with the subscriber premises 130 via fiber optic cables (when fiber to the premises (FTTP) is installed), coaxial cables, or telephone lines. Because subscriber premises 130 are typically wired with coaxial cable, even an FTTP network may be considered to be an HFC network.

Similarly, the head-end 110 may be in communication with the content sources via various transmission media, including, but not limited to, fiber optic cables, coaxial cables, telephone lines, and radio waves. Content sources 140 include television stations 141, telephone networks 142, and content servers 143. Television stations 141 include local broadcast stations, cable network stations, and satellite network stations. Telephone networks 142 include wireless networks, such as mobile phone cells in a cellular telephone network, as well as wired networks, such the trunk lines between cell towers and/or telephone exchanges. Content servers 143 include local content servers, such as the servers used by the service provider to store and provide VOD content, and remote content servers, such as those provided via the Internet or by other service providers.

Although, for purposes of simplicity, only one local node 120 and one subscriber premises 130 are illustrated in FIG. 1, one of ordinary skill in the art will understand that a head-end 110 may be in communication with multiple local nodes 120 and each local node 120 may be in communication with multiple subscriber premises 130. One of ordinary skill in the art will also recognize that a head-end 110 may be implemented in a single office or facility, or in a ring of multiple offices or facilities that act as distributed hubs of the head-end 110, which may be in communication with each other via fiber optic cables or radio waves, such as, for example, microwave transmissions.

At the subscriber premises 130, services are received from the local node 120 by network interface devices 131, such as, for example, cable modems, set top boxes (STB), cable cards, and Voice over Internet Protocol (VoIP) telephone interfaces. A network interface device 131 interfaces between the local node 120 and endpoint devices 132, and may convert signals comprising the services from one transmission medium to another transmission medium (e.g., between coaxial cable, Ethernet cable (category-6, category-6e, etc.), telephone cable (RJ11, RJ14, etc.), and radio waves), translate signals between encapsulation modes (e.g., shift signals to heterodynes, change signal standards, change modulation schemes), cache or buffer data for burst transmission, apply forward error correction, and route signals to the appropriate endpoint devices 132.

Endpoint devices 132 are devices used by consumers to consume content delivered over the CDN 100, such as, for example, televisions, Digital Video Recorders (DVR), computers (including desktops, laptops, tablets, netbooks, personal media servers, video game systems, etc.), landline phones (including Voice over Internet Packet (VoIP) and Plain Old Telephone Service (POTS) consoles), mobile phones, fax machines, networked printers, internet radios receivers, etc. In various aspects, endpoint devices 132 may incorporate interface devices 131, such as, for example, a combination STB and DVR.

As one of ordinary skill in the art will understand, the CDN 100 will include various computer devices, which are used to manage and control the provision of service via the CDN 100. For example, the encoding of a telephone call may be managed by a computer controlling the On-Off Keying of a laser diode over a fiber optic transmission medium. Computers used in the CDN 100 include processors and memory storage devices, which store instructions that when executed by the processors enable the provision of services. Memory storage devices are articles of manufacture that include computer-readable storage media. The term computer-readable storage media does not include transmission media, but refers to hardware media used to store desired information for access by a computer. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

Figure 2:
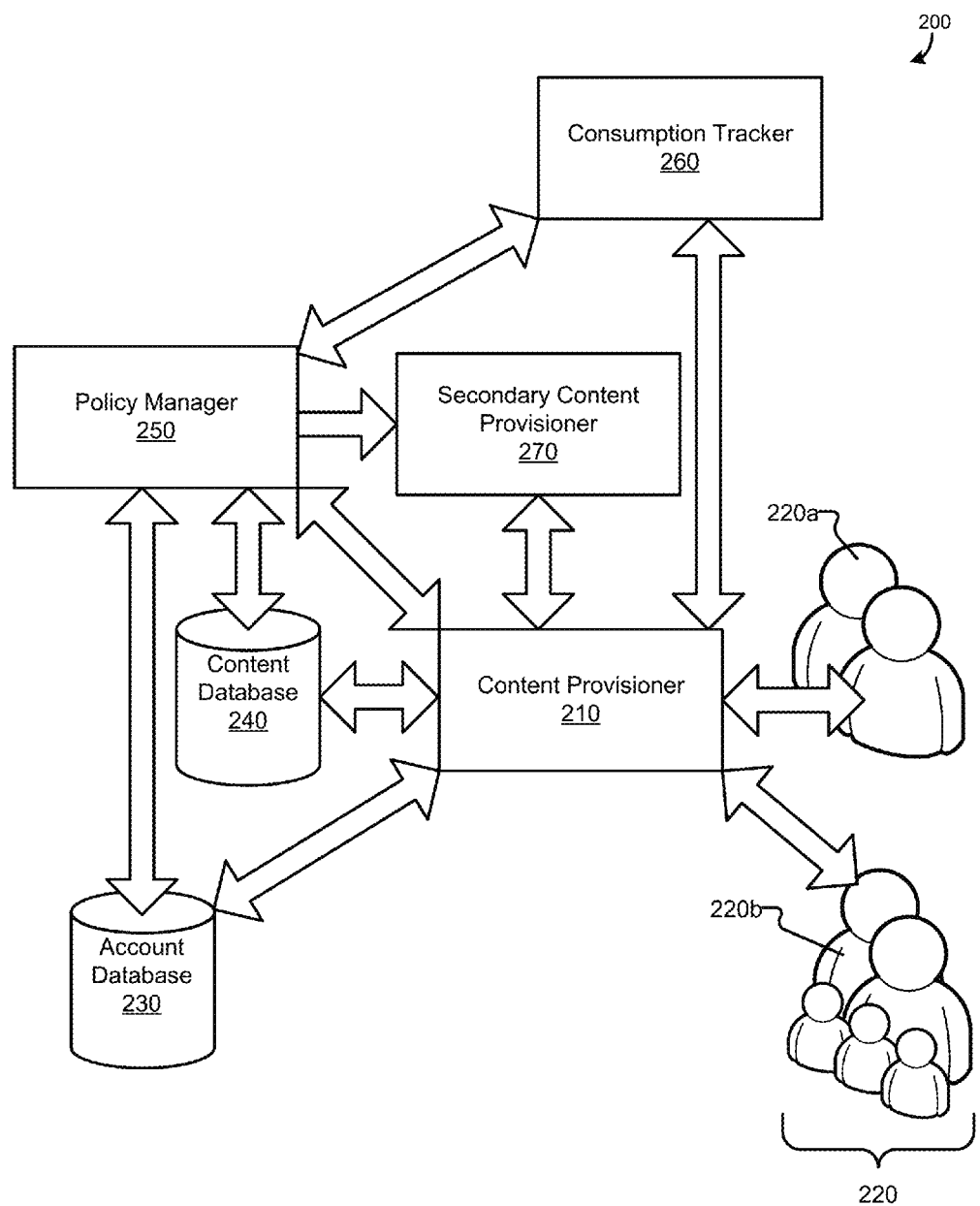
FIG. 2 illustrates an example block diagram of a credit system.

FIG. 2 illustrates an example block diagram of a credit system 200. The credit system 200 enables a service provider to credit consumers for consuming secondary content and control how credits are distributed among and to consumers. Consumers are provided content, both primary and secondary, via a content provisioner 210, such as the CDN 100 illustrated in FIG. 1, as subscribers 220 of a service provider's services. The content provisioner 210 provides subscribers 220 with content on demand (e.g., cable television, cable-delivered broadcast television, VOD), and the metadata related to content (e.g., VOD catalogs, scheduling information, synopses, content ratings). In various aspects, the content provisioner 210 may be in communication with an external secondary content provisioner 270, from which secondary content is retrieved (e.g., the National Weather Service, an advertisement service). When opted into by subscribers 220, the credit system 200 tracks when subscribers 220 consume secondary content, and based on which secondary content was actually consumed, and the subscriber's account details, an appropriate amount of credit is given to the subscriber's account or individual consumer profiles associated with a subscriber account. Although only two subscribers 220 and their associated consumers are illustrated in FIG. 2, one of ordinary skill in the art will understand that more or fewer subscribers 220 associated with more or fewer consumers may use the credit system 200.

Subscribers 220 are provided different services, and levels of services, via the content provisioner 210 based on the details of their associated subscriber accounts, which are stored in an account database 230. The subscriber account is used by the content provisioner 210 to determine which content is available to provide to the subscriber 220 from the content database 240. For example, the subscriber account for a first subscriber 220a may enable two consumers associated with the subscriber account to be provided with telephone services, basic cable television services, and limited VOD access, whereas the subscriber account for a second subscriber 220b may enable five consumers associated with the subscriber account to be provided with internet services, telephone services, premium cable television services, and expanded VOD access associated with the premium cable television services.

Additionally, the subscriber account is optionally operable to provide for several consumer profiles, which enables different content provision rules and credit awarding rates to be associated with each consumer profile. Additionally, activity profiles that are based on tracking the consumers' viewing patterns may be associated with the subscriber account or the consumer profiles. For example, the first subscriber 220a may not enable separate consumer profiles for the two consumers associated with the subscriber account and will be treated as one entity by the credit system 200, and the activity profile for the first subscriber will be used to influence which secondary content is recommended.

In an alternate example, the second subscriber 220b may enable separate consumer profiles, comprising consumer characteristics stored by the service provider, and when an individual consumer is logged into the an individual account, depending on which consumer profile is active, different content provision rules and credit award rates are enabled. Consumer profiles may be activated manually (e.g., logging in or manually switching profiles) or automatically, based on the primary content requested, time of day, or as a default consumer profile for the subscriber 220.

In various aspects, separate consumer profiles or device profiles may be generated manually by the consumers, such as, for example, parents may set up profiles for children that block access to inappropriate content that remains accessible to profiles set up for the parents. In other aspects, separate activity profiles may be generated automatically for a consumer profile or device profile based on viewing patterns, including time and content subject matter. For example, two separate activity profiles may be generated based on viewing patterns for the repeated viewing of broadcast cartoons from 3 pm until 5 pm and the repeated viewing of the broadcast news and a VOD drama from 10 pm until midnight. In other aspects, device profiles are associated with various interface device 131 or endpoint devices 132 used by the consumers. For example, within a subscriber premises 130, a first STB may be associated with a first device profile and a second STB may be associated with a second device profile. In another example, a computer and a mobile device may request and be provided content via a cable modem and separate device profiles will be associated with each endpoint device 132. Credit is accumulated by the policy manager 250 for each consumer profile or device profile associated with a subscriber account, and it is held in the account database 230 for later transfer or redemption.

As consumers consume content provided by the content provisioner 210, a policy manager 250 monitors how to credit the subscriber 220 for the consumed content. Content is weighted by the policy manger 250 along a spectrum of primary and secondary content weightings using various rules based on the subscriber account, consumer profiles, associated profile activities (e.g., social media accounts), viewing history of the content, delivery mode of the content, and content producer incentives. Depending on where the content falls on the weighting of primary and secondary content, more or less credit may be awarded to the subscriber 220 for viewing the content. For example, content that is weighted as primary content may provide no credit, whereas content that is designated as weakly secondary content (i.e., almost primary content) will provide a minor amount of credit, and content that is designated as strongly secondary content provides a major amount of credit. Additionally, primary content may be weighted as more or less desirable (e.g., premium content or standard content), and as a result may have more or fewer opportunities to earn credit for consuming secondary content.

Additionally, the policy manager 250 is operable to use the subscriber account to determine the number of consumers associated with a subscriber 220 and their consumer profiles to affect the amount of credit given for consuming content. For example, a first subscriber 220a may be associated with two consumers and will receive less credit for viewing a given piece of content than a second subscriber 220b associated with five consumers. However, the policy manager 250 may determine that the given content item is directed to a subset of consumers (or that certain consumer profiles associated with a subscriber 220 are blocked from viewing the given content item) so that fewer than all of the consumer profiles associated with a subscriber 220 are used to calculate how much credit given for consuming the given content item.

Depending on the content item, as more consumers consume the content item, the policy manager 250 is operable to lower the amount of credit given for consuming that content item. For example, a content producer may desire to encourage consumers to view a pilot episode of a television series and credit will be given to the first consumers so that buzz is generated for the new series. For example, a content item may have a credit associated with it for the first n days that it is available, or to the first n consumers that view the content item. Additionally, the amount of credit given may be adjusted upward or downward as more or fewer consumers consume the content over a period of time. For example, the first n consumers may be given twice as much credit as the next n consumers, and subsequent consumers are not provided any credit.

In addition, the policy manager 250 is operable to work in conjunction with social media platforms to reward consumers for recommending content to their contacts. For example, the policy manager 250 may include an Application Program Interface (API) and information identifying a social media profile associated with the subscriber 220 to determine when the subscriber 220 has shared a secondary content item, "liked" a secondary content item or related item (e.g., the movie shown in a trailer), added a secondary content item to a contact's playlist, updated a status to indicate the consumption of the secondary content item, or otherwise made public to their contacts the secondary content item. Depending on the number of contacts that the subscriber 220 has, and how the secondary content was shared, the policy manager 250 may give the subscriber 220 varying credit for sharing the secondary content. For example, a first subscriber 220a may receive more credit than a second subscriber 220b for sharing the same secondary content due to having more contacts, or sharing the secondary content as an imbedded video rather than a "like." Additionally, the policy manager 250 is operable to use the social media recommendation to enhance its determinations of which secondary content items are presented to which consumers, and the weighting assigned to content items.

Subscribers 220 may access the policy manager 250 via the content provisioner 210 to use or exchange their credit for various rewards or transfer their credit to between subscribers 220 or consumer/device profiles. The service provider may provide various rewards to consumers including, but not limited to, access to premium content, faster speeds for the provision of content, higher definition content, billing reductions, etc. Subscribers 220 may gain access to different rewards in tiers as credit is accumulated in the subscriber account or may exchange credit for rewards. Depending on the service provider's policies, subscribers 220 may also directly purchase credit or access to a tier, for example, to "bump" themselves to the next tier. Subscribers 220 may also request or approve transfers of credit between accounts and profiles when transfers are enabled by the service provider.

The consumption tracker 260 verifies whether the content provided by the content provisioner 210 has actually been consumed by the subscriber 220. The consumption tracker 260 addresses the technical difficulties involved in the service provider determining whether a content item, for which credit may be given, has actually been consumed by a consumer or has merely been provisioned to the consumer. The consumption tracker 260 is in communication with the policy manager 250 and the content provisioner 210 to determine which content items are being given credit by the policy manager 250 and whether they have been consumed via the content provisioner 210.

In various aspects, the account database 230, content database 240, policy manager 250, and the consumption tracker 260 may be located at the same facility as the head-end 110, a local node 120, or a separate facility. The account database 230, content database 240, policy manager 250, and the consumption tracker 260 may be located in the same location or may be distributed across several locations to operate as a distributed system.

Figure 3:
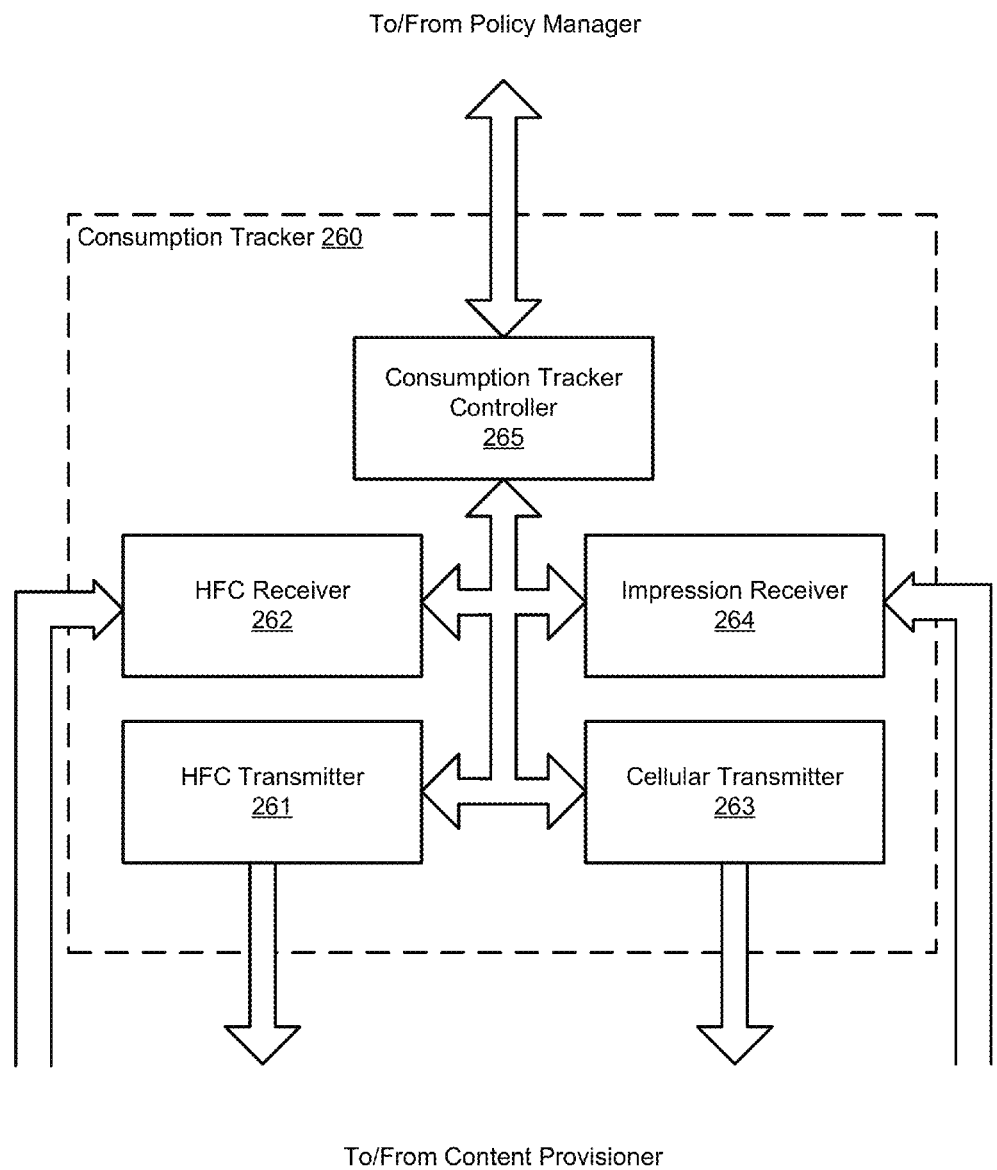
FIG. 3 is a detailed illustration of the consumption tracker highlighting specific purpose components.

FIG. 3 is a detailed illustration of the consumption tracker 260 highlighting specific purpose components. The consumption tracker 260 ensures that secondary content is not only transmitted to the subscriber 220, but is reliably consumed before credit is given. The specific purpose components include an HFC transmitter 261, an HFC receiver 262, a cellular transmitter 263, and an impression receiver 264. In various aspects, the consumption tracker 260 may disable or omit some of the specific purpose components, for example, only the HFC transmitter 261 and HFC receiver 262 may be active, or only the HFC receiver 262 and cellular transmitter 263 may be active.

The specific components are controlled (and activated or disabled) by the consumption tracker controller 265. The consumption tracker controller 265 is in communication with the policy manager 250 to monitor the delivery of secondary content and to transmit the determination of whether the subscriber 220 consumed the secondary content. In various aspects, the consumption tracker controller 265 is implemented as a computing device, such as that illustrated in FIG. 6. The consumption tracker controller 265 may thus include instructions, provided by the policy manager 250, that identify how the secondary content is to be transmitted to the subscribers 220, and how the subscribers 220 will be determined to have consumed the secondary content.

The HFC transmitter 261 is operable to transmit communications to the subscriber 220 via one or more STB network interface devices 131. When the subscriber premises 130 include more than one STB, the HFC transmitter 261 may address its message to one or more STBs by using a Media Access Control (MAC) address, Internet Packet (IP) address, serial number, or other identifier so that only the destined STBs react to the communication. Alternatively, the HFC transmitter 261 will transmit its message via a single channel so that all STBs in the subscriber premises 130 tuned to that channel will receive the message, but STBs tuned to a different channel will not receive the message. For example, a first STB tuned to receive VOD may receive messages including secondary content or requests for feedback, while a second STB tuned to a broadcast channel will not receive those messages until it is tuned to receive VOD.

In various aspects, the messages transmitted by the HFC transmitter 261 may include requests for feedback from the subscriber 220 that affect the presentation of primary content being provided to the consumer. A request for feedback may affect the presentation of primary content by interrupting and pausing the primary content, interrupting and not pausing the primary content, or by being displayed in an overlay in conjunction with the primary content. As will be appreciated, requests for feedback may be presented or feedback collected throughout a viewing session, and does not need to be tied to a given primary or secondary content item. For example, the message may be a request to the subscriber 220 to perform a certain action to receive credit for consuming the secondary content that is sent every thirty minutes during a viewing session, or if no feedback is received for thirty minutes (e.g., volume changes, channel changes) no credit for the session will be awarded (as will be appreciated, the time period may differ in different aspects). When the message requests a user input from the consumer in a request for feedback, the message is operable to disable the normal functionality of control signals (e.g., infrared signals from a remote control to an associated STB). For example, when the message requests that the consumer submit feedback by pressing the "channel up" button on an associated remote control, the normal functionality of "channel up" in the STB to tune to a higher channel or request a higher channel from a head-end 110 will be temporarily disabled so that the consumer may submit feedback without changing the channel. The content request signals may be re-enabled after a feedback signal is received and the consumer is determined to be consuming the secondary content, or after a pre-determined period of time (e.g., 30 s), after which period it may be determined that the consumer missed the feedback request and is not consuming the secondary content.

In various aspects, the HFC transmitter 261 may be omitted from the consumption tracker 260. In these aspects, the secondary content provided from the content database 240 may already include a prompt for feedback from the consumer, or the service provider may elect to not request feedback via the STB. Instead of specifically requesting feedback, the service provider may treat any signal sent from STB as a feedback signal. For example, when a consumer reaches the end of a VOD program, the consumer may request a second VOD program or request a live stream of a television network channel, and the service provider may treat this request as a feedback signal.

The HFC receiver 262 is operable to receive feedback signals from a subscriber 220 via the STB used by the subscriber 220 as an interface device 131. Feedback signals are sent from the STB to the head-end 110 where they are interpreted for forwarding to the consumption tracker 260. In aspects where the consumption tracker 260 is part of the head-end 110, feedback signals are formatted so as not to be confused with station-keeping signals (e.g., synchronization, service handshakes) or content-request signals (e.g., channel changes, VOD requests). In aspects where the consumption tracker 260 is not part of the head-end 110, but a separate device, the feedback signal is addressed so that the head-end 110 will forward the feedback signals to the HFC receiver 262 for use in determining whether the secondary content was consumed. In some aspects, content-request signals (or the lack thereof) may double as feedback signals, both positive and negative, of whether the secondary content is being consumed. For example, a request to change a channel part-way through a secondary content item may be used as a feedback signal to indicate that the consumer is not consuming the secondary content, and a lack of a content-request signal for a pre-defined time may be used to indicate that the consumer has left the television on and is no longer consuming the content being delivered to the television.

An HFC transmitter 261 and an HFC receiver 262 are operable to send and receive messages, respectively, via optical signals over the CDN 100. Depending on the architecture of the CDN 100, signals may be sent and/or received by fixed wavelength or wavelength-tunable optics, including, but not limited to, photodiodes, laser diodes, and light emitting diodes.

The cellular transmitter 263 is operable to transmit communications to the subscriber 220 via one or more mobile telephones associated with the subscriber 220. When more than one mobile telephone is associated with a subscriber account, the cellular transmitter 263 may transmit to one or multiple mobile telephones based on a preference or an association with the network interface device 131 used to consume primary content. For example, when a subscriber account includes two mobile telephone numbers, the subscriber may designate one as the preferred telephone number for the cellular transmitter 263 to use. In another example, where the subscriber premises 130 include two STBs and the subscriber account includes two mobile telephone numbers, the first mobile telephone number is associated with the first STB and the second mobile telephone number is associated with the second STB so that the cellular transmitter 263 will communicate using the mobile telephone number associated with a given STB when content is delivered via that STB. In various aspects, the consumption tracker 260 may be signaled by the head-end 110 as to which STB is requesting content, or the HFC receiver 262 may, in addition to the head-end 110, also receive a content-request signal from a given STB, which the consumption tracker 260 uses to determine which STB (and which mobile telephone number) to use.

In various aspects, the messages transmitted by the cellular transmitter 263 may include secondary content or a request for feedback from the subscriber 220. For example, the message may include secondary content (e.g., a weather alert) via a Short Message Service (SMS) or Multimedia Message Service (MMS) message that may include text, images, audio, and/or video. In some aspects, the message includes a feedback request for the subscriber to "text back" when the secondary content has been consumed. In other aspects, the message may include a delivery report request as part of the message or a tracking pixel within an image or video so that the mobile telephone automatically responds to the consumption tracker 260 when the message has been accessed by the consumer.

The impression receiver 264 is operable to receive confirmation from a mobile telephone to which secondary content or a feedback request was sent that the consumer associated with the mobile telephone has consumed the content. In various aspects, the confirmation may be automatically sent by the mobile telephone or manually sent by the user of the mobile telephone (e.g., as a reply text message).

In aspects where a feedback request is transmitted by the HFC transmitter 261 or cellular transmitter 263, the consumption tracker controller 265 is operable to control how the secondary content or feedback request is transmitted to the subscriber 220. In various aspects, secondary content is retrieved from the content database 240 for provision to the subscriber 220 based on an active activity, consumer, or device profile. Depending on options chosen by the subscriber 220 or the service provider, and the format of the secondary content, the secondary content or feedback requests will be formatted for transmission via the HFC transmitter 261 or the cellular transmitter 263. For example, when the subscriber 220 has chosen to not receive secondary content or feedback requests via mobile phone (or has not provided a mobile telephone number), the consumption tracker controller 265 will monitor the transmission of secondary content or feedback requests via the HFC transmitter 261, but not a cellular transmitter 263, to that subscriber. In another example, when the secondary content is a pilot episode of a television series, the consumption tracker controller 265 will send periodic requests for feedback via the HFC transmitter 261 and/or the cellular transmitter 263, and will listen for negative feedback signals (e.g., the consumer changing the channel from the secondary content) to determine whether the secondary content is being consumed.

When secondary content is delivered along with primary content, such as, for example, as overlays or interruptions of the primary content, the controller 265 is operable to persist a credit earning session across multiple channels or content items. For example, when the subscriber has opted in to receive credit for consuming secondary content and is switching between several channels to view multiple concurrent primary content items, such as, for example, concurrent baseball games, secondary content may be presented as an overlay on the primary content even as the primary content changes.

In various aspects, the consumption tracker controller 265 is operable to set where the secondary content or feedback request are displayed on a display device. This may be done to overlay or avoid overlaying any station identification, news tickers, or advertisements built into the primary content (e.g., a station logo watermark). In other aspects, the provider of the primary content will insert the secondary content into the primary content at appropriate break points in the primary content item. For example, a secondary content item may be inserted into a VOD item where a commercial break would occur in the broadcast of that item. In another example, so that audio is not clipped and an appropriate video frame to start playback from is selected, the secondary content item will be inserted at the intra-coded from (i.e., an I-frame) instead of a predictive frame of the primary content item (e.g., a P-frame or a B-frame). One of ordinary skill in the art will understand the use of I-, P-, and B-frames in compressed video.

Despite the potential benefits in prominently displaying secondary content or a feedback request by overlaying all or a large portion of a visual image, overlaying or drowning out the audio, or interrupting and pausing the primary content with secondary content or the feedback request, this sort of presentation is often aggravating to consumers. Additionally, when requesting feedback from a subscriber 220, a prominent display of secondary content or a feedback request enables inattentive consumers, who are potentially not consuming the secondary content, to still react to the feedback request. For example, when the consumer is reading a book instead of consuming the secondary content that is being delivered, a prominent display may be noticed by the otherwise inattentive consumer and reacted to as though the consumer had been attentive. One of ordinary skill in the art will appreciate from the present disclosure the potential benefits and drawbacks inherent in the choice of how prominently to display secondary content or a request for feedback, and will be able to adjust the prominence thereof to match the desired effect in a given implementation.

The consumption tracker controller 265 is also operable, in some aspects, to set a time window in which the subscriber may reply to a request for feedback or before the ability to earn credit for consuming secondary content times out. For example, the consumption tracker controller 265 may provide a consumer with a time window of 5, 10, 15, etc., seconds to respond to a request for feedback. Similarly, if the consumption tracker controller 265 does not receive and content-request signals from the subscriber 220 within a time window of 30, 45, 50, etc., minutes, the consumption tracker controller 265 is operable to end the credit earning session and not provide (or provide a fraction) of the credit available since the last verified time that the secondary content was being consumed. In various aspects, the consumption tracker controller 265 may cause the HFC transmitter 261 or cellular transmitter 263 to transmit a feedback request before timing the consumer out.

In addition to managing time windows for receiving credit and where requests for feedback are displayed relative to primary content, the consumption tracker controller 265 is also operable to recommend when to present secondary content or a request for feedback. For example, the consumption tracker controller 265 may recommend presenting secondary content or a request for feedback at the beginning, at the end, or at a time during the primary content. In another example, the controller may recommend presenting a request for feedback at the beginning, at the end, or at a time during a presentation on secondary content. One of ordinary skill in the art will understand that depending on the duration and media used for the primary and secondary content, certain times may be more or less advantageous to present secondary content and request for feedback. For example, requesting feedback at the beginning of secondary content may be acceptable for a short segment of secondary content (e.g., a 30 s teaser for a movie) but unacceptable for a long segment of secondary content (e.g., a five minute trailer for a movie) as the consumer may stop consuming the secondary content after the request for feedback without the service provider knowing, unless additional requests for feedback are used. As will be understood, frequent requests for feedback may become aggravating to the consumer, and one of ordinary skill in the art will appreciate from the present disclosure the potential benefits and drawbacks inherent in the choice of when to present secondary content or a request for feedback, and will be able to adjust the timing and frequency thereof to match the desired effect in a given implementation.

The consumption tracker controller 265 is further operable to communicate with the service provider to adjust when (i.e., how often and how long) secondary content is presented to the consumer. For example, if a consumer does not respond to a request for feedback, the consumption tracker controller 265 may transmit recommendations that the frequency at which secondary content is transmitted may be increased, the duration of the secondary content's provision may be increased, the intrusiveness of the secondary content may be increased, or the consumer may be automatically logged out from receiving credit for viewing secondary content. Conversely, if the consumer does respond to a request for feedback, the consumption tracker controller 265 may transmit recommendations that the frequency at which secondary content is transmitted may be decreased, the duration of the secondary content's provision may be decreased, or the intrusiveness of the secondary content may be decreased. For example, when the consumer is transmitted secondary content of a weather alert while viewing VOD primary content, the consumption tracker controller 265 may recommend persisting the transmission of the weather alert until a feedback signal is received, and the intrusiveness, frequency, and duration at which the weather alert is provided in relation to the primary content will be increased until the feedback signal is received.

Figure 4:
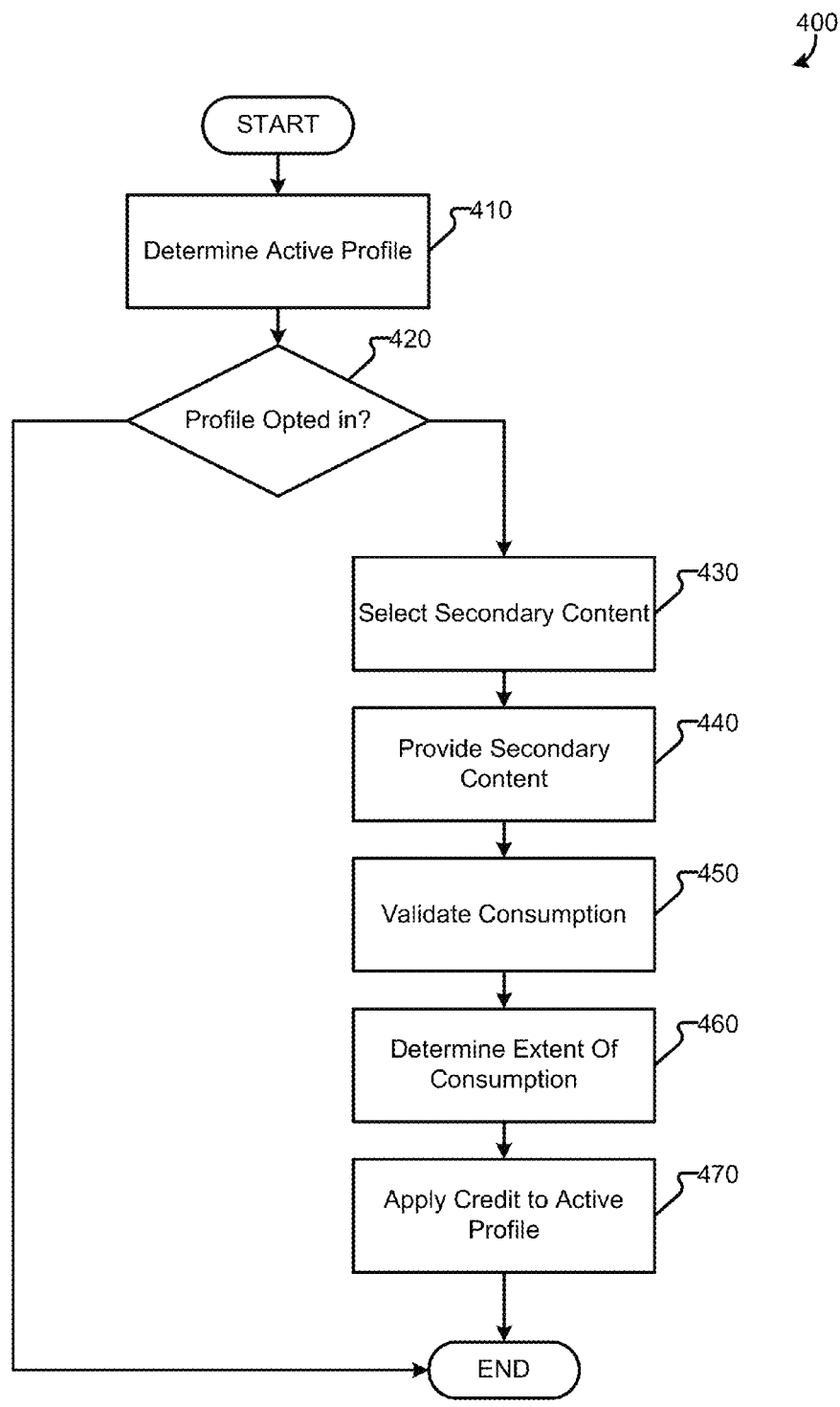
FIG. 4 is a flowchart illustrating general stages in an example method for awarding credit for consuming secondary content.

FIG. 4 is a flowchart illustrating general stages in an example method 400 for awarding credit for consuming secondary content. Method 400 begins at OPERATION 410, where an active profile is determined. The active profile may be a device profile for the device on which secondary content will be provided or a consumer profile for a consumer that will be credited for consuming the secondary content. When a subscriber account includes multiple consumer, activity, or device profiles, the determination of which profile is active (i.e., the profile that is actively used while consuming the content) may be based on consumer preferences within a subscriber account (e.g., setting a default profile), the type of content being provisioned, the time that content is being provisioned, the identification information of the device requesting the content, or a manual selection in of a given profile which is transmitted to the service provider.

Once the active profile is determined, method 400 proceeds to DECISION OPERATION 420, where it is determined whether the active profile has opted in to earn credit for consuming secondary content. Although credit may be transferred between profiles after it has been given regardless of whether that profile has opted in, to actively earn credit, the consumer must opt in a profile. If the profile is not opted in, method 400 may conclude. As will be understood, secondary content may still be selected by consumers or provided to consumers, but because they have not opted in (or have opted out), verification of consumption may not occur, and no credit will be provided. When the provision of secondary content for credit has been opted into for the active profile, method 400 proceeds to OPERATION 430.

At OPERATION 430 secondary content is selected. In various aspects, secondary content is selected for the consumer by the secondary content provisioner 270. The policy manager 250 is operable to determine how to award credit for consuming secondary content based on the active profile's viewing history, associated geographic location, profile settings, the secondary content provided, and navigation choices within an interactive program guide, as well as incentives from content producers to promote their content and recommendations from other profiles (e.g., the profiles of friends of the consumer, other consumer profiles associated with the subscriber account). In various aspects, the policy manager 250 provides profile information useful for determine which secondary content to provide to the secondary content provisioner 270 (e.g., the national weather service, an advertisement decision manager). For example, the viewing history for the active profile may indicate that the consumer associated with the profile is interested in a given genre, format (e.g., movies, mini-series, cartoons, sports), actor, director, tone (e.g., comedic, tragic, mysterious), critical rating, or content rating (e.g., R, not TV-MA, red band trailers, unrated items), of secondary content or that the consumer has already been presented a given secondary content item. In another example, the consumer's navigation choices to view available VOD content within a category (e.g., comedy, recently broadcast TV, horror films, documentaries) are provided with secondary content appropriate to that category.

After the secondary content is selected in OPERATION 430, method 400 proceeds to OPERATION 440, where the secondary content is provided to the consumer. In various aspects, the secondary content may be sent in series to or in parallel in time with the primary content, in which case the secondary content may be spliced dynamically into the primary content by the service provider or by the client on the endpoint device 132 or network interface device 131.

Secondary content may be provided on the same endpoint device 132 or a different endpoint device 132 as the primary content is provided on. For example, primary content may be provided on a television, and secondary content is transmitted to a cellphone associated with the subscriber 220 or inserted into the primary content displayed on the television.

As will be understood, when secondary content is inserted in primary content, the primary content item may include tags to indicate appropriate times to insert secondary content items into its presentation. In various aspects, the selected secondary content may be transmitted at the time it is to be displayed, or at a time before it is to be displayed (e.g., at the time of selection of the primary content item, at the determination of the active profile) and stored by an interface device 131, such as, for example, a combination STB-DVR, to be displayed at the appropriate time.

At OPERATION 450 the consumption of the secondary content provided in OPERATION 440 is validated. In various aspects, depending on how the secondary content was provided, validation may occur actively or passively over an HFC network or a cellular network. For example, when the secondary content is sent to a cellphone associated with the subscriber 220, the consumer may be asked to actively validate consumption by sending a text message, or a read receipt or tracking pixel may be used to passively indicate that the secondary content was consumed. In another example, a request for feedback is sent over the HFC network to prompt the consumer to actively perform as task (e.g., press "7" on a remote control) to validate consumption of the secondary content. In another example, the consumption tracker 260 monitors user input (e.g., changing channels, requesting program guides) to determine if the consumer is active or present as the secondary content is being provided. In yet another aspect, a social media account may be associated with the active consumer profile so that sharing of the content item on a social media platform (e.g., updating a personal status, "liking" the secondary content item, sending a message to a contact related to the secondary content item) is used to validate that the secondary content was consumed.

At OPERATION 460 the extent of consumption of secondary content is determined. In various aspects, the consumer's consumption of secondary content is validated per secondary content item or per period of time.

In aspects where validation is determined per secondary content item, the consumer may be asked to provide feedback for each secondary content item presented to the consumer, and the consumer will be given credit upon validation.

In aspects where consumption is validated for a period of time, the extent (or duration) of consumption may be determined inclusively or exclusively of the last validation. For example, at various times a consumer may opt in to consume secondary content at $t_0$, respond to a feedback request at $t_1$, miss responding to a feedback request at $t_2$, and respond to a feedback request at $t_3$. In this example, the consumer has been determined to be actually consuming content at $t_0$ and $t_1$, and will be given credit for the times falling between $t_0$ and $t_1$. As will be appreciated, these example requests for feedback may be separated across the a viewing session so that repeated validations are not required for an individual content item (primary or secondary), which could interfere with a consumer's viewing experience, but impressions are tracked and validated frequently enough that a consumer cannot leave an endpoint device 132 on and leave for work and receive credit for the whole day. Continuing the example, at $t_2$ the consumer is determined to no longer be paying attention to the content (e.g., has left the room) when the request for feedback is missed. In an inclusive determination, the consumer will be given credit for consuming content from $t_1$ until $t_2$, whereas in an exclusive determination, the consumer will not be given credit for consuming content between $t_1$ and $t_2$. No credit will be given to the consumer from $t_2$ until $t_3$, under either scheme as the consumer has not been validated as consuming content until $t_3$ occurs, at which time the consumer may begin earning credit again.

Once the extent of secondary content consumption has been determined in OPERATION 460, method 400 proceeds to OPERATION 470, where credit is applied to the active profile for consuming the secondary content. Depending on the rules within the credit policy, different amounts of credit may be applied to the active account. For example, the consumer may be given credit for opting in to consume secondary content while consuming VOD primary content and be given a varying amount of credit depending on the length of time the primary content is consumed while opted in, the amount of secondary content items presented to the consumer, or a duration of the secondary content presented to the consumer. For example, the time consuming the content may be broken into fractions of the content item's presentation time (e.g., quartiles, quintiles, sextiles) for reporting purposes. The credit given for consuming a given secondary content item may also vary based on the type of secondary content item or how it is presented for consumption, for example, a weather alert may provide less credit than a movie trailer, or a secondary content item consumed via a consumer's STB may provide less credit that that same secondary content item being consumed via a consumer's mobile telephone. The amount of credit may also vary based on subscriber account details (e.g., number of consumers associated under a subscriber 220), a content producer incentive, or a number of times that the secondary content has been consumed (e.g., by a given consumer, consumers under the same subscriber 220, by all consumers in a geographic area).

Method 400 may then conclude.

Figure 5:
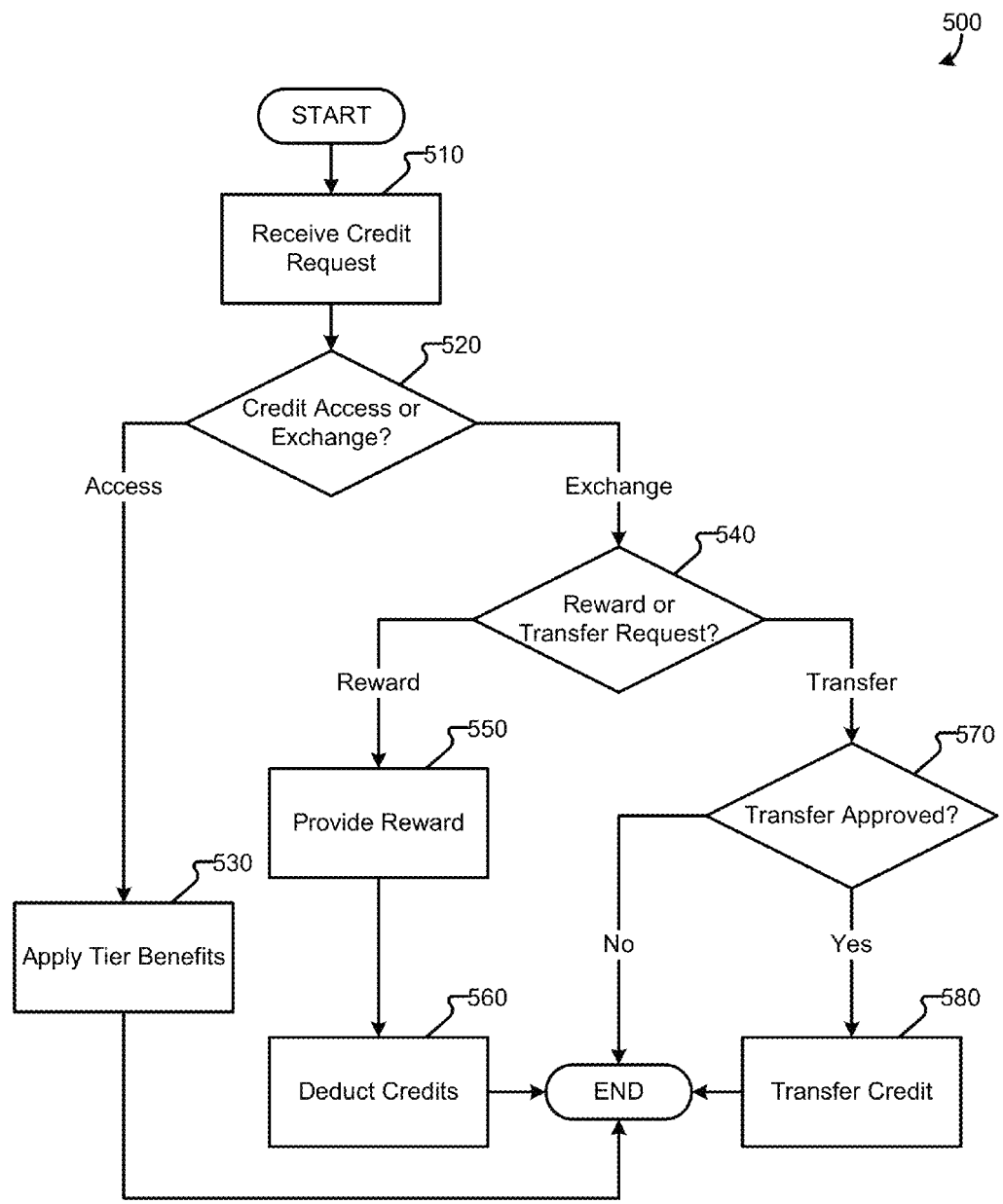
FIG. 5 is a flowchart illustrating general stages in an example method for using or exchanging credit for rewards or transferring credits between consumers.

FIG. 5 is a flowchart illustrating general stages in an example method 500 for using or exchanging credit for rewards or transferring credits between consumers. Method 500 begins at OPERATION 510 when a credit request from a consumer is received. As part of the credit request, the profile of the consumer is verified, which may include in various aspects requesting and receiving a username/password pair, prompting the consumer via an STB or associated mobile phone to confirm the request, or via a biometric signal, such as for example, a fingerprint via a scanner on a remote control.

Method 500 then proceeds to DECISION OPERATION 520, where it is determined whether the request is for access to rewards based on a credit amount or is for an exchange of credit. In various aspects, credit may unlock tiers of features for a consumer, or may be exchanged with the service provider or another consumer. For example, once a consumer has accumulated x amount of credit, the consumer is provided access to commercial-free VOD content and the amount of credit associated with the consumer will remain the same. In another example, the consumer may exchange x credit for access to a Pay-Per-View content item or to gift x credit to another consumer, in which case the amount of credit associated with the consumer will then be debited x credit. As will be understood, service providers may allow some, but not all of the credit requests described herein; whether a given action is available to subscribers 220 is at the service provider's discretion.

When it is determined that the credit request is for access based on a credit amount, method 500 proceeds to OPERATION 530, where tier benefits are applied for the requesting profile. Multiple tiers of benefit may set by the service provider as it sees fit at various levels of credit, and tiers may be periodically reset (or credit towards a tier reset). Tier rewards are set by the service provider and may include access to content items, improvements to quality of service (improved speed, reduced commercials, higher quality audio/video, etc.), or vouchers (e.g., credits against a bill). Method 500 then concludes when the consumer is provided the tier's benefit.

When it is determined that the credit request is for a credit exchange, method 500 proceeds to DECISION OPERATION 540, where it is determine whether the credit exchange is between consumers to transfer credit or between a consumer and the service provider to redeem a reward.

When it is determined at DECISION OPERATION 540 that the credit request is to redeem a reward, method 500 proceeds to OPERATION 550. At OPERATION 550, it is determined whether the consumer has sufficient credit for the requested reward. If the consumer has sufficient credit, the reward is provided to the consumer. Otherwise, the consumer is alerted that the reward requires additional credit, and in various aspects, the consumer is prompted to earn additional credit or request additional credit from another consumer.

At OPERATION 560 the corresponding amount of credit is deducted from the consumer's profile, and method 500 concludes.

When it is determined at DECISION OPERATION 540 that the credit request is to transfer credit between consumers, method 500 proceeds to DECISION OPERATION 570. At DECISION OPERATION 570 is it determined whether the credit transfer has been approved. The requesting consumer may either request to be given credit from another consumer or to give credit to another consumer. In either case, approval from the other consumer may be required before credit is transferred. In various aspects, the other consumer is prompted for approval of the transfer via a prompt sent via an STB, a mobile telephone, or in an email. When the request for a transfer is approved, method 500 proceeds to OPERATION 580. Otherwise, method 500 concludes.

At OPERATION 580 the requested credit is transferred, adding it to the receiving consumer's profile and deducting it from the transmitting consumer's profile. In various aspects, the service provider may require a minimum or set a maximum transfer size between consumers and deduct a flat amount or a percentage of transferred credit for each transfer. For example, consumers may have to transmit between 100 and 1000 units of credit in multiples of 100 units, of which the receiving consumer will receive 90% of the credit units transferred. After the credit is transferred, method 500 concludes.

Figure 6:
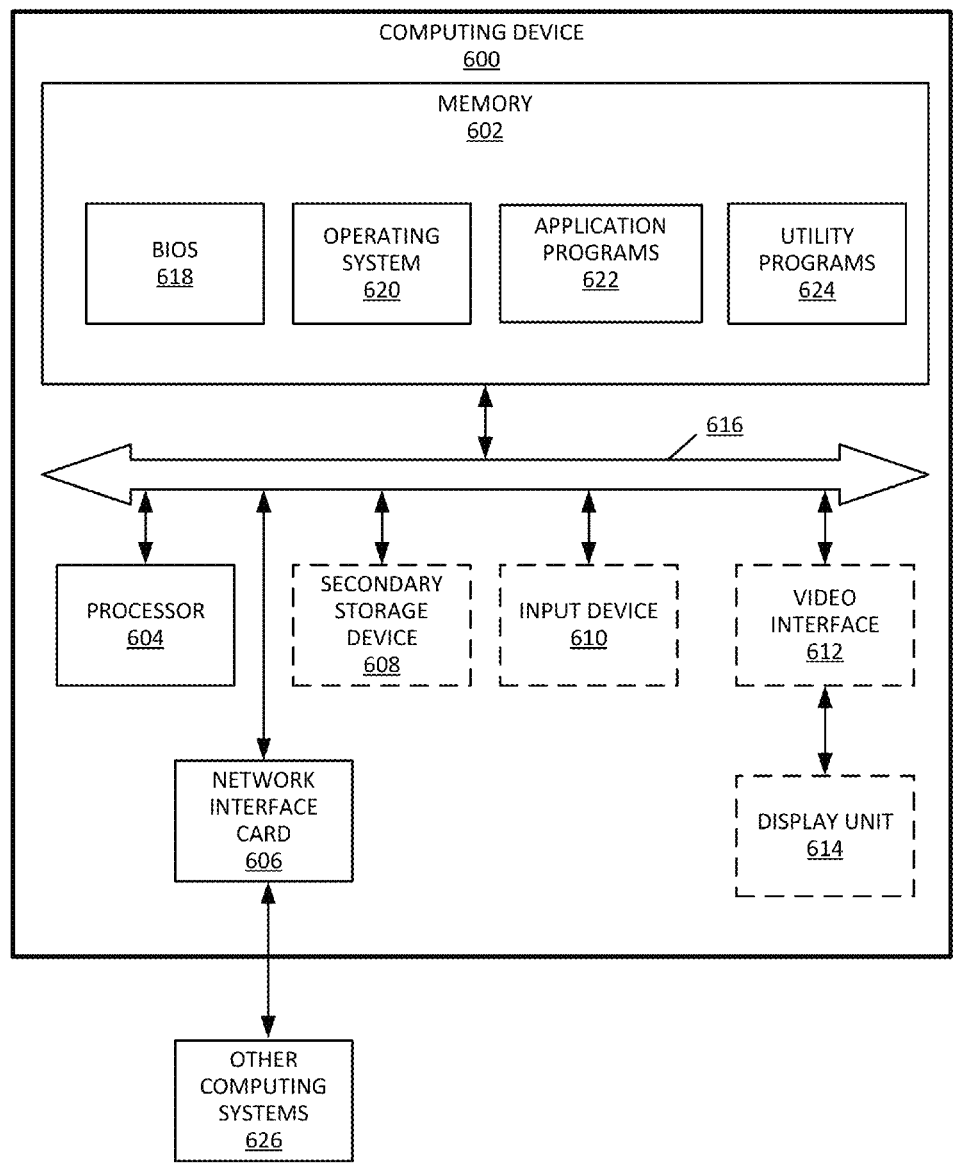
FIG. 6 is a block diagram illustrating example physical components of a computing device with which embodiments of the present disclosure may be practiced.

FIG. 6 is a block diagram illustrating example physical components of a computing device 600 with which embodiments of the present disclosure may be practiced. In some embodiments, one or a combination of the components of the credit system 200 are implemented using one or more computing devices like the computing device 600. It should be appreciated that in other embodiments, one or a combination of the components of the credit system 200 may be implemented using computing devices having hardware components other than those illustrated in the example of FIG. 6.

Computing devices may be implemented in different ways in different embodiments. For instance, in the example of FIG. 6, the computing device includes a memory 602, a processor 604, a network interface 606, an optional secondary storage device 608, an input device 610, a video interface 612, communicated with a display unit 614, and a communications medium 616. In other embodiments, the computing device 600 may be implemented using more or fewer hardware components or in combination with other types of computer systems and program modules.

The memory 602 includes one or more computer-readable storage media capable of storing data or computer-executable instructions that, when executed by processor 604, provide functionalities as described herein. In various embodiments, the memory 602 is implemented in various ways. For example, the memory 602 can be implemented as various types of computer-readable storage media to store various types of data or software instructions. For instance, in the example of FIG. 6, the memory 602 stores a Basic Input/Output System (BIOS) 618 and an operating system 620. The BIOS 618 includes a set of software instructions that, when executed by the processor 604, cause the computing device 600 to boot up. The operating system 620 includes a set of software instructions that, when executed by the processor 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The memory 602 also stores one or more utility programs 624 that, when executed by the processor 604, cause the computing device 600 to provide utilities to other software programs.

The optional secondary storage device 608 includes one or more computer-readable storage media, and may store data and computer-executable instructions not directly accessible by the processor 604. That is, the processor 604 performs an I/O operation to retrieve data or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid-state memory devices, or other types of computer-readable storage media.

The processor 604 includes one or more processing units, which may include tangible integrated circuits that selectively execute computer-executable instructions. In various embodiments, the processing units in the processor 604 are implemented in various ways. For example, the processing units can be implemented as one or more processing cores. In another example, the processor 604 can comprise one or more separate microprocessors. In yet another example, the processor 604 can comprise Application-Specific Integrated Circuits (ASICs) that provide specific functionality. In yet another example, the processor 604 provides specific functionality by using an ASIC and by executing computer-executable instructions.

The computing device 600 may be enabled to send data to, and receive data from, a communication network via a network interface 606. In different embodiments, the network interface 606 is implemented in different ways, such as an Ethernet interface, a token-ring network interface, a fiber optic network interface, a wireless network interface (e.g., Wi-Fi, Wi-Max, etc.), or another type of network interface. The network interface 606 enables the computing device 600 to communicate with other computing systems 626, such as over a wireless network in a distributed computing environment, a satellite link, a cellular link, and comparable mechanisms. Other devices may include computer device(s) 600 that execute communication applications, storage servers, and comparable devices.

The optional input device 610 enables the computing device 600 to receive input from a user. Example types of input devices 610 include, but are not limited to: keyboards, mice, trackballs, stylus input devices, keypads, microphones, joysticks, touch-sensitive display screens, and other types of devices that provide user input to the computing device 600.

The optional video interface 612 outputs video information to an optional display unit 614. In different embodiments, the video interface 612 is implemented in different ways. For example, the video interface 612 may be a video expansion card. In another example, the video interface 612 is integrated into a motherboard of the computing device 600. In various aspects, the display unit 614 can be an LCD display panel, a touch-sensitive display panel, an LED screen, a projector, a cathode-ray tube display, or another type of visual display device. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processor 604, the network interface 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

Embodiments of the present disclosure may be used in various distributed computing environments where tasks are performed by remote processing devices that are linked through a communications network in a distributed computing environment.

Examples and aspects are described above with reference to block diagrams or operational illustrations of methods, systems, and devices. The functions/acts noted in the blocks may occur out of the order as shown in any flowchart or described herein with reference to FIGS. 4 and 5. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated. For example, the functionality of transceivers may be implemented as discrete receivers and transmitters.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

We claim:

1. A consumption tracker for promoting and verifying consumption of secondary content via a hybrid fiber-coaxial (HFC) network used to deliver primary content requested by a given consumer, comprising:
  an HFC transmitter, operable to transmit, via the HFC network to a set top box (STB) accessible by the given consumer, secondary content and requests for feedback related to the secondary content, wherein the transmitted secondary content affects presentation of the primary content;
  an HFC receiver, operable to receive feedback signals via the HFC network transmitted from the STB associated with the given consumer in response to the requests for feedback;
  a consumption tracker controller, operable to determine an extent of consumption of the secondary content transmitted by the HFC transmitter based on a time when the feedback signals are received by the HFC receiver, and the consumption tracker controller is further operable to transmit a message to a policy manger to update a consumer profile for the given consumer to reflect the extent of consumption of the secondary content by the given consumer, wherein the policy manager is operable to:
    determine a weight by which to update the consumer profile based on:
      a number of other consumers associated with a subscriber account associated with the given consumer;
      a desirability of the secondary content;
      a number of times that the secondary content has been consumed; and
      whether the given consumer shared a status related to consuming the secondary content via a social media platform; and
    provide benefits to the given consumer based on a credit associated with the consumer profile, wherein the benefits include:
      an increase in quality of service; and
      a credit transfer to a different consumer profile.

2. The consumption tracker of claim 1, further comprising:
  a cellular transmitter, operable to transmit, via a cellular network in communication with the HFC network to a mobile phone associated with the given consumer, the secondary content and the requests for feedback;
  an impression receiver, operable to receive cellular feedback signals via the cellular network from the mobile phone;
  wherein the consumption tracker controller is further operable to determine the extent of consumption of the secondary content transmitted by the cellular transmitter based on a time when the cellular feedback signals are received by the cellular receiver; and
  wherein the secondary content and requests for feedback transmitted by the cellular transmitter are transmitted via a text message to the mobile phone.

3. The consumption tracker of claim 2, wherein the requests for feedback are transmitted by the cellular transmitter.

4. The consumption tracker of claim 1, wherein the transmitted secondary content affects the presentation of the primary content by overlaying a portion of the primary content with the secondary content while the primary content is being presented.

5. The consumption tracker of claim 1, wherein the transmitted secondary content affects the presentation of the primary content by interrupting the presentation of the primary content with the secondary content until the secondary content has been fully presented.

6. The consumption tracker of claim 1, wherein when the given consumer requests new primary content, the STB displays the secondary content while waiting for the new primary content to be delivered from a head-end.

7. The consumption tracker of claim 1, wherein the requests for feedback override content request signals on the STB, wherein content request signals received by the STB are interpreted as the feedback signals.

8. The consumption tracker of claim 1, further to determine whether an active profile associated with the given consumer is opted in to receive the secondary content.

9. The consumption tracker of claim 1, wherein the secondary content is selected by the given consumer.

10. A method for promoting and verifying consumption of secondary content via a hybrid fiber-coaxial (HFC) network used to deliver primary content requested by a consumer, comprising:
  selecting a secondary content item;
  providing the secondary content item to the consumer;
  receiving a feedback signal from the consumer indicating that an action was performed while the secondary content item was provided to the consumer, validating consumption of the secondary content item;
  in response to receiving the feedback signal from the consumer, determining an extent of consumption;
  updating a consumer profile associated with the consumer to reflect the extent of consumption by the consumer including determining a weight by which to update the consumer profile based on:
    a number of other consumers associated with a subscriber account associated with the consumer;
    a desirability of the secondary content item;
    a number of times that the secondary content item has been consumed; and
    whether the consumer shared a status related to consuming the secondary content item via a social media platform; and
  providing benefits to the consumer based on a credit associated with the consumer profile, wherein the benefits include:
    an increase in quality of service; and
    a credit transfer to a different consumer profile.

11. The method of claim 10, further comprising:
  determining whether an active profile associated with the consumer is opted in to receive secondary content item.

12. The method of claim 10, wherein the secondary content item is selected by the consumer.

13. The method of claim 10, wherein providing the secondary content item to the consumer further comprises:
  inserting the secondary content item into primary content of a video on demand (VOD) content item, wherein inserting the secondary content item comprises overlaying the VOD content item with the secondary content item while the VOD content item is presented to the consumer.

14. The method of claim 13, wherein the secondary content item is an emergency weather alert inserted during the VOD content item; and wherein the emergency weather alert is selected based on a location of the consumer.

15. The method of claim 10, wherein the secondary content item is provided via a text message, including a tracking pixel, transmitted to a mobile phone associated with the consumer; and
   wherein the feedback signal is received from the mobile phone via the tracking pixel, and wherein the action is accessing the text message.

16. The method of claim 10, wherein the feedback request is received from a set top box (STB) associated with the consumer; wherein the action is transmitting an STB command signal; and wherein the feedback signal uses the STB command signal and ignores the functionality of the STB command signal.

17. The method of claim 10, wherein the extent of consumption is determined based on a period of time between when the feedback signal was received and a previous verification of consumption.

18. A system for promoting and verifying consumption of secondary content via a hybrid fiber-coaxial (HFC) network used to deliver primary content requested by a given consumer, comprising:
   a content provisioner in communication with a plurality of subscribers, wherein each subscriber of the plurality of subscribers is associated with at least one consumer, the content provisioner operable to provide primary content items and secondary content items to each subscriber, and receive feedback signals from each subscriber, wherein the feedback signals indicate actions taken by the given consumer in relation to the provision of the secondary content items;
   a consumption tracker in communication with the content provisioner, the consumption tracker operable to verify consumption of a given secondary content item by the given consumer according to the feedback signals, wherein the consumption tracker is further operable to determine an extent of consumption of the secondary content items; and
   a policy manager, in communication with the consumption tracker and the content provisioner, the policy manager operable to update a consumer profile associated with the given consumer to reflect the extent of consumption of the secondary content items, wherein the policy manager is further operable to:
      determine a weight by which to update the consumer profile based on:
         a number of other consumers associated with a subscriber account associated with the given consumer;
         a desirability of the secondary content items;
         a number of times that the secondary content items have been consumed; and
         whether the given consumer shared a status related to consuming the secondary content items via a social media platform; and
      provide benefits to the given consumer based on a credit associated with the consumer profile, wherein the benefits include:
         an increase in quality of service; and
         a credit transfer to a different consumer profile.

19. The system of claim 18, wherein the feedback signals are received via a mobile phone associated with the given consumer.

20. The system of claim 18, wherein the secondary content items affect presentation of the primary content item by superseding presentation of the primary content items.

* * * * *